(12) United States Patent
Li

(10) Patent No.: US 10,159,281 B2
(45) Date of Patent: Dec. 25, 2018

(54) ELECTRONIC CIGARETTE, CIGARETTE ROD, CIGARETTE CARTRIDGE AND RECOGNITION METHOD OF CIGARETTE CARTRIDGE

(71) Applicant: Beijing Sigma Microelectronics Co., Ltd, Beijing (CN)

(72) Inventor: Zhiqian Li, Beijing (CN)

(73) Assignee: Beijing Sigma Microelectronics Co., Ltd, Beijing (CN)

( * ) Notice: Subject to any disclaimer, the term of this patent is extended or adjusted under 35 U.S.C. 154(b) by 421 days.

(21) Appl. No.: 15/202,293

(22) Filed: Jul. 5, 2016

(65) Prior Publication Data

US 2017/0000192 A1 Jan. 5, 2017

(30) Foreign Application Priority Data

Jul. 2, 2015 (CN) .......................... 2015 1 0383293

(51) Int. Cl.
*A61L 9/03* (2006.01)
*A24F 47/00* (2006.01)
*H05B 1/02* (2006.01)
*G05B 15/02* (2006.01)
*G06K 9/62* (2006.01)
*G06K 9/03* (2006.01)

(52) U.S. Cl.
CPC ............ *A24F 47/008* (2013.01); *G05B 15/02* (2013.01); *G06K 9/03* (2013.01); *G06K 9/6201* (2013.01); *H05B 1/0244* (2013.01)

(58) Field of Classification Search
None
See application file for complete search history.

(56) References Cited

U.S. PATENT DOCUMENTS

| 8,499,766 | B1 * | 8/2013 | Newton | A24F 47/002 |
| | | | | 131/273 |
| 9,603,386 | B2 * | 3/2017 | Xiang | A24F 47/008 |
| 9,675,114 | B2 * | 6/2017 | Timmermans | A24F 47/008 |
| 9,808,032 | B2 * | 11/2017 | Yamada | A24F 47/008 |
| 2007/0283972 | A1 * | 12/2007 | Monsees | A24F 47/006 |
| | | | | 131/273 |

(Continued)

*Primary Examiner* — Thor Campbell
(74) *Attorney, Agent, or Firm* — Pearl Cohen Zedek Latzer Baratz LLP

(57) ABSTRACT

The present disclosure claims an electronic cigarette, a cigarette rod, a cigarette cartridge, and a recognition method of a cigarette cartridge, wherein the electronic cigarette includes: the cigarette rod and the cigarette cartridge. The cigarette rod includes: a battery and a controller, and the cigarette cartridge includes: an atomizer and a recognition information provider component connected with the atomizer, wherein the atomizer is connected with the controller via the recognition information provider component, wherein the recognition information provider component is configured to send recognition information to the controller, and the controller is configured to judge whether the cigarette rod and the cigarette cartridge are matched, and if so, allow the atomizer to work normally. Otherwise, the controller executes alarming or prohibits the atomizer from working normally. The present disclosure solves the technical problem of ineffective use of an electronic cigarette due to improper use of the electronic cigarette.

16 Claims, 1 Drawing Sheet

(56) References Cited

U.S. PATENT DOCUMENTS

| | | | |
|---|---|---|---|
| 2009/0095287 A1* | 4/2009 | Emarlou | A61M 11/041 128/200.14 |
| 2010/0163063 A1* | 7/2010 | Fernando | A24F 47/008 131/184.1 |
| 2011/0036346 A1* | 2/2011 | Cohen | A61M 15/0065 128/200.14 |
| 2012/0048266 A1* | 3/2012 | Alelov | A61M 11/005 128/202.21 |
| 2013/0104916 A1* | 5/2013 | Bellinger | A61M 11/041 131/328 |
| 2013/0284192 A1* | 10/2013 | Peleg | A24F 47/002 131/329 |
| 2013/0319440 A1* | 12/2013 | Capuano | A24F 47/008 131/329 |
| 2013/0340775 A1* | 12/2013 | Juster | H04L 67/42 131/273 |
| 2014/0053856 A1* | 2/2014 | Liu | A24F 47/008 131/329 |
| 2014/0107815 A1* | 4/2014 | LaMothe | A24F 15/18 700/90 |
| 2014/0123990 A1* | 5/2014 | Timmermans | A24F 47/008 131/328 |
| 2014/0174459 A1* | 6/2014 | Burstyn | A24F 47/008 131/273 |
| 2014/0246035 A1* | 9/2014 | Minskoff | A24F 47/008 131/329 |
| 2014/0251324 A1* | 9/2014 | Xiang | A24F 47/008 128/202.21 |
| 2014/0253144 A1* | 9/2014 | Novak, III | A24F 47/008 324/550 |
| 2014/0261486 A1* | 9/2014 | Potter | A24F 47/008 131/328 |
| 2014/0305820 A1* | 10/2014 | Xiang | A24F 15/18 206/236 |
| 2014/0334804 A1* | 11/2014 | Choi | A61M 15/06 392/404 |
| 2014/0360512 A1* | 12/2014 | Xiang | H02J 7/0077 131/328 |
| 2015/0047662 A1* | 2/2015 | Hopps | A24F 47/008 131/329 |
| 2015/0053217 A1* | 2/2015 | Steingraber | A24F 47/008 131/329 |
| 2015/0075546 A1* | 3/2015 | Kueny, Sr. | A24F 47/008 131/329 |
| 2015/0122252 A1* | 5/2015 | Frija | A24F 47/008 128/202.21 |
| 2015/0173124 A1* | 6/2015 | Qiu | A24F 47/008 131/328 |
| 2015/0223522 A1* | 8/2015 | Ampolini | A24F 47/008 131/328 |
| 2015/0224268 A1* | 8/2015 | Henry | A24F 47/008 128/202.21 |
| 2015/0237917 A1* | 8/2015 | Lord | A24F 47/008 131/328 |
| 2015/0245661 A1* | 9/2015 | Milin | A24F 47/008 131/329 |
| 2015/0257445 A1* | 9/2015 | Henry, Jr. | A24F 47/008 131/328 |
| 2015/0258289 A1* | 9/2015 | Henry, Jr. | A61M 15/06 128/202.21 |
| 2015/0288468 A1* | 10/2015 | Xiang | H04W 84/18 455/500 |
| 2015/0357839 A1* | 12/2015 | Cai | A24F 47/008 131/329 |
| 2015/0359263 A1* | 12/2015 | Bellinger | H05B 1/0244 392/394 |
| 2016/0007651 A1* | 1/2016 | Ampolini | A24F 47/008 131/328 |
| 2018/0132531 A1* | 5/2018 | Sur | A24F 47/008 |
| 2018/0160730 A1* | 6/2018 | Bless | A24F 47/008 |
| 2018/0184722 A1* | 7/2018 | Murison | F04B 43/046 |
| 2018/0192702 A1* | 7/2018 | Li | H05B 1/0277 |

* cited by examiner

ELECTRONIC CIGARETTE, CIGARETTE ROD, CIGARETTE CARTRIDGE AND RECOGNITION METHOD OF CIGARETTE CARTRIDGE

FIELD OF THE INVENTION

The present disclosure relates to the field of electronic products, and particularly to an electronic cigarette, a cigarette rod, a cigarette cartridge and a recognition method of a cigarette cartridge.

BACKGROUND OF THE INVENTION

All manufacturers of brand electronic cigarettes have their own cigarette cartridges and liquid solutions. At present, cigarette cartridges and cigarette rods, and cigarette cartridges and liquid solutions of electronic cigarettes on the market may be used in a mixed manner regardless of different brands as long as the electronic cigarettes are provided with substantially similar structures. However, mix use of cigarette cartridges (or replicas of the cigarette cartridges) and cigarette rods of different brands, or mix use of cigarette cartridges (or replicas of the cigarette cartridges) and liquid solutions of different brands not only shortens the service life of electronic cigarettes, but also reduces the effect in quitting smoking.

Therefore, a cigarette cartridge needs to be matched with a cigarette rod and a liquid solution of the same brand in order to ensure the using effect of an electronic cigarette. However, an electronic cigarette may be used improperly due to the fact that whether a cigarette cartridge and a cigarette rod, and a cigarette cartridge and a liquid solution are products of the same brand can be hardly recognized in the prior art, thereby resulting in ineffective use of the electronic cigarette, and shortening the service life of the electronic cigarette.

At present, there is no effective solution yet for the problem.

SUMMARY OF THE INVENTION

Embodiments of the present disclosure provide an electronic cigarette, a cigarette rod, a cigarette cartridge, and a recognition method of a cigarette cartridge, so as to at least solve the technical problem of ineffective use of an electronic cigarette due to improper use of the electronic cigarette.

An electronic cigarette is provided according to an aspect of the embodiments of the present disclosure, including: a cigarette rod and a cigarette cartridge; the cigarette rod includes: a battery and a controller connected with the battery; the cigarette cartridge includes: an atomizer and a recognition information provider component connected with the atomizer, wherein the atomizer is connected with the controller via the recognition information provider component, wherein the controller includes: a first interface, the recognition information provider component includes: a second interface, and the atomizer includes: a first end, wherein the first interface, the second interface and the first end are all connected with a ground wire or a power wire; the controller further includes: a third interface, the recognition information provider component further includes: a fourth interface, and the atomizer further includes: a second end, wherein the fourth interface is connected with the third interface, and the second end is connected with the third interface, wherein the recognition information provider component is configured to send recognition information to the controller, and the controller is configured to judge, according to the received recognition information, whether the cigarette rod and the cigarette cartridge are matched, and if matched, allows the atomizer to work normally; otherwise, the controller executes alarming or prohibits the atomizer from working normally.

Further, the cigarette rod further includes: a microphone structure and the controller is arranged in the microphone structure.

Further, the recognition information is transmitted in a form of an electric signal.

Further, the electric signal carries at least one of brand information, model information and production batch information of the cigarette cartridge.

Further, the recognition information provider component includes: a capacitor, wherein the capacitor charges and discharges in the case that the cigarette rod and the cigarette cartridge are connected; during the discharging process, the capacitor functions as a power source to provide electric energy for the cigarette rod to recognize the cigarette cartridge.

A cigarette rod is further provided according to another aspect of the embodiments of the present disclosure, configured to form an electronic cigarette with a cigarette cartridge, wherein the cigarette rod includes: a battery and a controller connected with the battery, wherein the controller is configured to judge, according to received recognition information sent by a recognition information provider component, whether the cigarette rod and the cigarette cartridge are matched, and if matched, allows an atomizer to work normally; otherwise, the controller executes alarming or prohibits the atomizer from working normally; the cigarette cartridge includes: the atomizer, and the recognition information provider component connected with the atomizer; the atomizer is connected with the controller via the recognition information provider component; the controller includes: a first interface, the recognition information provider component includes: a second interface, and the atomizer includes: a first end, wherein the first interface, the second interface and the first end are all connected with a ground wire or a power wire; the controller further includes: a third interface, the recognition information provider component further includes: a fourth interface, and the atomizer further includes: a second end, wherein the fourth interface is connected with the third interface, and the second end is connected with the third interface.

A cigarette cartridge is further provided according to still another aspect of the embodiments of the present disclosure, configured to form an electronic cigarette with a cigarette rod, wherein the cigarette cartridge includes: an atomizer, and a recognition information provider component connected with the atomizer, wherein the recognition information provider component is configured to send recognition information to a controller; the controller is configured to judge, according to the received recognition information, whether the cigarette rod and the cigarette cartridge are matched, and if matched, allows the atomizer to work normally. Otherwise, the controller executes alarming or prohibits the atomizer from working normally; the cigarette rod includes: a battery and the controller connected with the battery; the atomizer is connected with the controller via the recognition information provider component; the controller includes: a first interface, the recognition information provider component includes: a second interface, and the atomizer includes: a first end, wherein the first interface, the second interface and the first end are all connected with a ground wire or a power wire; the controller further includes: a third interface, the recognition information provider component further includes: a fourth interface, and the atomizer further includes: a second end, wherein the fourth interface is connected with the third interface and the second end is connected with the third interface.

A recognition method of a cigarette cartridge is further provided according to still another aspect of the embodiments of the present disclosure, the cigarette cartridge forming an electronic cigarette with a cigarette rod, wherein the cigarette rod includes: a battery and a controller connected with the battery; the cigarette cartridge includes: an atomizer and a recognition information provider component connected with the atomizer; the atomizer is connected with the controller via the recognition information provider component, wherein the controller includes: a first interface, the recognition information provider component includes: a second interface, and the atomizer includes: a first end, wherein the first interface, the second interface and the first end are all connected with a ground wire or a power wire; the controller further includes: a third interface, the recognition information provider component further includes: a fourth interface, and the atomizer further includes: a second end, wherein the fourth interface is connected with the third interface and the second end is connected with the third interface; the recognition information provider component sends recognition information to the controller; the controller judges, according to the received recognition information, whether the cigarette rod and the cigarette cartridge are matched; and if matched, allows the atomizer to work normally; otherwise, the controller executes alarming or prohibits the atomizer from working normally.

Further, after the atomizer is allowed to work normally if the cigarette rod and the cigarette cartridge are matched, the method further includes that an electric current in associated circuits of the cigarette cartridge locates is adjusted, so as to control the amount of smoke in the cigarette cartridge.

In the embodiments of the present disclosure, a cigarette rod automatically recognizes whether a cigarette cartridge is matched with the cigarette rod when the cigarette rod is connected with the cigarette cartridge. An electronic cigarette includes the cigarette rod and the cigarette cartridge. The cigarette rod includes: a battery and a controller connected with the battery. The cigarette cartridge includes: an atomizer and a recognition information provider component connected with the atomizer. The atomizer is connected with the controller via the recognition information provider component. The recognition information provider component is configured to send recognition information to the controller, and the controller is configured to judge, according to the received recognition information, whether the cigarette rod and the cigarette cartridge are matched, and if matched, allow the atomizer to work normally, and otherwise, the controller executes alarming or prohibits the atomizer from working normally, thus the cigarette rod and the cigarette cartridge in the electronic cigarette are used in a matched manner, so as to implement the technical effect of using the electronic cigarette properly to prolong the service life thereof to further solve the technical problem of ineffective use of the electronic cigarette due to improper use of the electronic cigarette.

BRIEF DESCRIPTION OF THE DRAWINGS

The accompanying drawings illustrated herein are used for providing further understanding to the present disclosure and constitute a part of the present application. The exemplary embodiments of the present disclosure and illustration thereof are used for explaining the present disclosure, instead of constituting improper limitation to the present disclosure. In the accompanying drawings.

DETAILED DESCRIPTION OF THE INVENTION

The technical solutions in the embodiments of the present disclosure will be described clearly and completely below with reference to the accompanying drawings in the embodiments of the present disclosure so as to enable those skilled in the art to better understand the solutions of the present disclosure. Obviously, the described embodiments are merely a part rather than all of the embodiments of the present disclosure. All other embodiments obtained by a person of ordinary skill in the art based on the embodiments in the present disclosure without creative efforts shall belong to the protection scope of the present disclosure.

It needs to be noted that the terms "first," "second," and the like in the specification, claims, and the accompanying drawings of the present disclosure are used for differentiating similar objects, and are not necessarily used for describing a specific sequence or order. It should be understood that data used in this way is interchangeable if appropriate, so that the embodiments of the present disclosure described herein may be implemented in a sequence except those shown or described herein. In addition, the terms "include," "have," and any variants of them are intended to mean non-exclusive inclusion. For example, processes, methods, systems, products, or devices that include a series of steps or units are not necessarily limited to the steps or units that are clearly listed, but may also include other steps or units that are not clearly listed or are inherent in these processes, methods, products, or devices.

Embodiment 1

A device embodiment of an electronic cigarette is provided according to the embodiment of the present disclosure.

Figure 1:
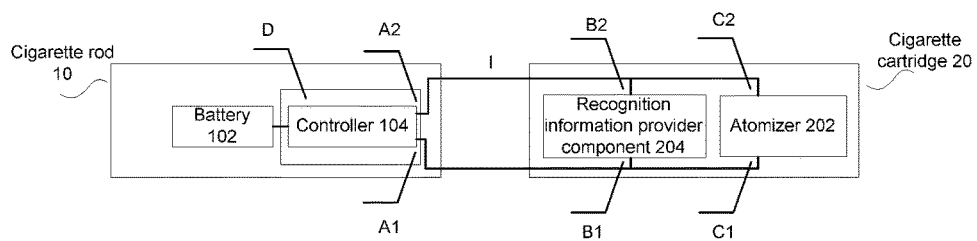
FIG. 1 is a structural diagram of an electronic cigarette according to an embodiment of the present disclosure.

FIG. 1 is a structural diagram of an electronic cigarette according to an embodiment of the present disclosure. As shown in FIG. 1, the electronic cigarette includes a cigarette rod 10 and a cigarette cartridge 20. Further, the cigarette rod 10 includes: a battery 102 and a controller 104 connected with the battery 102; the cigarette cartridge 20 includes: an atomizer 202 (including a heating wire) and a recognition information provider component 204 connected with the atomizer 202, wherein the atomizer 202 is connected with the controller 104 via the recognition information provider component 204, wherein whether the cigarette rod 10 and the cigarette cartridge 20 in the electronic cigarette are matched is recognized according to the following process: the recognition information provider component 204 is configured to send recognition information to the controller 104, and the controller 104 is configured to judge, according to the received recognition information, whether the cigarette rod 10 and the cigarette cartridge 20 are matched, and if so, allows the atomizer 202 to work normally; otherwise, the controller 104 executes alarming or prohibits the atomizer 202 from working normally.

In use, specific recognition information may be stored in advance in the recognition information provider component 204. After the cigarette rod 10 and the cigarette cartridge 20 are connected, the recognition information provider component 204 communicates with the controller 104. Specifically, the recognition information provider component 204 sends the specific recognition information to the controller 104 by means of pulse sequences. At the moment, the controller 104 receives these pulse sequences, and decodes the pulse sequences, so as to obtain recognition information (e.g. an Identification (ID) number and so on) of the cigarette cartridge 20 to recognize whether cigarette cartridge 20 and the cigarette rod 10 are matched, and if so, allows the electronic cigarette to work. At the moment, a smoker may use the electronic cigarette normally. Otherwise, the electronic cigarette gives an alarm so as to prompt the smoker that the electronic cigarette cannot be used normally. Or the electronic cigarette does not give the alarm, and is directly prohibited from working normally. In this way, the cigarette rod 10 may be matched with a cigarette cartridge 20 of the same brand, or even of the same model, thereby improving the effect in using the electronic cigarette, prolonging the service life of the electronic cigarette and improving the effect in quitting smoking of electronic cigarette.

As shown in FIG. 1, the controller 104 includes: a first interface A1, the recognition information provider component 204 includes: a second interface B1, and the atomizer 202 includes: a first end C1, wherein the first interface A1, the second interface B1 and the first end C1 are all connected with a ground wire or a power wire.

The controller 104 further includes: a third interface A2, the recognition information provider component 204 further includes: a fourth interface B2, and the atomizer 202 further includes: a second end C2, wherein the third interface A2, the fourth interface B2 and the second end C2 may be connected according to the following method: the fourth interface B2 is connected with the third interface A2, a connection line therebetween is a first connection line l, and the second end C2 is connected with the third interface A2.

In this connection manner, the pulse sequences corresponding to the recognition information (e.g. the ID number) stored in the recognition information provider component 204 in the cigarette cartridge 20 are generated on the first connection line l and the ground wire (or the power wire), so as to enable the controller 104 of the cigarette rod 10 to read the pulse sequences, decode the pulse sequences, and verify whether the cigarette cartridge 20 and the cigarette rod 10 are matched.

Alternatively, in the case that the fourth interface is connected with the third interface, and the second end is connected with the third interface, the controller controls the atomizer to work normally if the cigarette rod and the cigarette cartridge are matched. Otherwise, the controller executes alarming or prohibits the atomizer from working normally.

By means of the embodiment, the cigarette rod 10 automatically recognizes whether the cigarette cartridge 20 is matched with the cigarette rod when the cigarette rod and the cigarette cartridge are connected, thereby achieving the purpose of using the cigarette rod 10 and the cigarette cartridge 20 in the electronic cigarette in a matched manner, preventing mix use of the cigarette rod 10 with a cigarette cartridge 20 of a different brand, or mix use with a replica of the cigarette cartridge 20, so as to implement the technical effect of enabling the smoker to use the electronic cigarette properly to improve an application safety factor of the electronic cigarette, improve the effect in using the electronic cigarette, prolong the service life of the electronic cigarette, and improve the effect in quitting smoking.

Alternatively, as shown in FIG. 1, the cigarette rod 10 further includes: a microphone structure D and the controller 104 is arranged in the microphone structure D. The microphone structure D not only has a decoding function, but also has basic functions of the electronic cigarette, such as functions including detection of an inhaling action, and driving the heating wire in the atomizer 202 to generate heat and charge electricity and so on.

Alternatively, the recognition information may be transmitted in a form of an electric signal. Specific content and principles are the same as those in the foregoing embodiment and will not be repeated here.

Alternatively, the electric signal carries at least one of brand information, model information and production batch information of the cigarette cartridge. The controller in the microphone structure may effectively adjust an electric current of smoking according to the electric signal, so as to control an amount of discharged smoke, thereby ensuring the effect in using the electronic cigarette.

Alternatively, the recognition information provider component may include: a capacitor, wherein the capacitor charges and discharges in the case that the cigarette rod and the cigarette cartridge are connected. During the discharging process, the capacitor functions as a power source to provide electric energy for the cigarette rod to recognize the cigarette cartridge. In this way, the recognition process of the recognition information provider component may be powered without an external power source, thus simplifying a circuit structure so that the electronic cigarette is able to be manufactured into a large cigarette with a relatively large volume, and may be also manufactured into a small cigarette with a relatively small volume.

Embodiment 2

A device embodiment of a cigarette rod is provided according to the embodiment of the present disclosure.

As shown in FIG. 1, the cigarette rod 10 is configured to form an electronic cigarette with a cigarette cartridge 20, wherein the cigarette rod 10 includes: a battery 102 and a controller 104 connected with the battery 102, wherein the controller 104 is configured to judge, according to received recognition information sent by a recognition information provider component 204, whether the cigarette rod 10 and the cigarette cartridge 20 are matched, and if so, allow an atomizer to work normally. Otherwise, the controller executes alarming or prohibits the atomizer from working normally. Here, the cigarette cartridge 20 includes: the atomizer 202 and the recognition information provider component 204 connected with the atomizer 202. The atomizer 202 is connected with the controller 104 via the recognition information provider component 204. As shown in FIG. 1, the controller 104 includes: a first interface A1, the recognition information provider component 204 includes: a second interface B1, and the atomizer 202 includes: a first end C1, wherein the first interface A1, the second interface B1 and the first end C1 are all connected with a ground wire or a power wire. The controller 104 further includes: a third interface A2, the recognition information provider component 204 further includes: a fourth interface B2, and the atomizer 202 further includes: a second end C2, wherein the third interface A2, the fourth interface B2 and the second end C2 may be connected by the following method: the fourth interface B2 is connected with the third interface A2, a connection line therebetween is a first connection line l and the second end C2 is connected with the third interface A2.

In this connection manner, pulse sequences corresponding to the recognition information (e.g. an ID number) stored in the recognition information provider component 204 in the cigarette cartridge 20 are generated on the first connection line l and the ground wire (or the power wire), so as to enable the controller 104 of the cigarette rod 10 to read the pulse sequences, decode the pulse sequences, and verify whether the cigarette cartridge 20 and the cigarette rod 10 are matched.

In use, specific recognition information may be stored in advance in the recognition information provider component 204. After the cigarette rod 10 and the cigarette cartridge 20 are connected, the recognition information provider component 204 communicates with the controller 104. Specifically, the recognition information provider component 204 sends the specific recognition information to the controller 104 by means of pulse sequences. At the moment, the controller 104 receives these pulse sequences, and decodes the pulse sequences, so as to obtain recognition information (e.g. an ID number and so on) of the cigarette cartridge 20 to recognize whether cigarette cartridge 20 and the cigarette rod 10 are matched, and if so, allows the electronic cigarette to work. At the moment, a smoker may use the electronic cigarette normally. Otherwise, the electronic cigarette gives an alarm so as to prompt the smoker that the electronic cigarette cannot be used normally. Or the electronic cigarette does not give the alarm, and is directly prohibited from working. In this way, the cigarette rod 10 may be matched with a cigarette cartridge 20 of the same brand, or even of the same model, thereby prolonging the service life of the electronic cigarette and improving the effect in quitting smoking of the electronic cigarette.

By means of the embodiment, the cigarette rod 10 automatically recognizes whether the cigarette cartridge 20 is matched with the cigarette rod when the cigarette rod and the cigarette cartridge are connected, thereby achieving the purpose of using the cigarette rod 10 and the cigarette cartridge 20 in the electronic cigarette in a matched manner, preventing mix use of the cigarette rod 10 with a cigarette cartridge 20 of a different brand, or mix use with a replica of the cigarette cartridge 20, so as to implement the technical effect of enabling the smoker to use the electronic cigarette properly to improve an application safety factor of the electronic cigarette, prolong the service life of the electronic cigarette, and improve the effect in quitting smoking.

It needs to be noted that the cigarette rod in the second embodiment is the same as cigarette rod on the electronic cigarette in the first embodiment, and will not be repeated here.

Embodiment 3

A cigarette cartridge is provided according to the embodiment of the present disclosure.

As shown in FIG. 1, the cigarette cartridge 20 is configured to form an electronic cigarette with a cigarette rod 10. The cigarette cartridge 20 includes: an atomizer 202 and a recognition information provider component 204 connected with the atomizer 202, wherein the recognition information provider component 204 is configured to send recognition information to a controller 104. The controller 104 is configured to judge, according to the received recognition information, whether the cigarette rod 10 and the cigarette cartridge 20 are matched, and if so, allow the atomizer to work normally. Otherwise, the controller executes alarming or prohibits the atomizer from working normally. The cigarette rod 10 includes: a battery 102 and the controller 104 connected with the battery 102. The atomizer 202 is connected with the controller 104 via the recognition information provider component 204. As shown in FIG. 1, the controller 104 includes: a first interface A1, the recognition information provider component 204 includes: a second interface B1, and the atomizer 202 includes: a first end C1, wherein the first interface A1, the second interface B1 and the first end C1 are all connected with a ground wire or a power wire. The controller 104 further includes: a third interface A2, the recognition information provider component 204 further includes: a fourth interface B2, and the atomizer 202 further includes: a second end C2, wherein the third interface A2, the fourth interface B2 and the second end C2 may be connected according to the following method: the fourth interface B2 is connected with the third interface A2, a connection line therebetween is a first connection line l, and the second end C2 is connected with the third interface A2.

In this connection manner, pulse sequences corresponding to the recognition information (e.g. an ID number) stored in the recognition information provider component 204 in the cigarette cartridge 20 are generated on the first connection line l and the ground wire (or the power wire), so as to enable the controller 104 of the cigarette rod 10 to read the pulse sequences, decode the pulse sequences, and verify whether the cigarette cartridge 20 and the cigarette rod 10 are matched.

In use, specific recognition information may be stored in advance in the recognition information provider component 204. After the cigarette rod 10 and the cigarette cartridge 20 are connected, the recognition information provider component 204 communicates with the controller 104. Specifically, the recognition information provider component 204 sends the specific recognition information to the controller 104 by means of pulse sequences. At the moment, the controller 104 receives these pulse sequences, and decodes the pulse sequences, so as to obtain recognition information (e.g. an ID number and so on) of the cigarette cartridge 20 to recognize whether cigarette cartridge 20 and the cigarette rod 10 are matched, and if so, allows the electronic cigarette to work. At the moment, a smoker may use the electronic cigarette normally. Otherwise, the electronic cigarette gives an alarm so as to prompt the smoker that the electronic cigarette cannot be used normally. Or the electronic cigarette does not give the alarm, and is directly prohibited from working. In this way, the cigarette rod 10 may be matched with a cigarette cartridge 20 of the same brand, or even of the same model, thereby prolonging the service life of the electronic cigarette and improving the effect in quitting smoking of the electronic cigarette.

By means of the embodiment, the cigarette rod 10 automatically recognizes whether the cigarette cartridge 20 is matched with the cigarette rod when the cigarette rod and the cigarette cartridge are connected, thereby achieving the purpose of using the cigarette rod 10 and the cigarette cartridge 20 in the electronic cigarette in a matched manner, preventing mix use of the cigarette rod 10 with a cigarette cartridge 20 of a different brand, or mix use with a replica of the cigarette cartridge 20, so as to implement the technical effect of enabling the smoker to use the electronic cigarette properly to improve an application safety factor of the electronic cigarette, prolong the service life of the electronic cigarette, and improve the effect in quitting smoking.

It needs to be noted that the cigarette cartridge in the third embodiment is the same as the cigarette cartridge on the electronic cigarette in the first embodiment, and will not be repeated here.

Embodiment 4

A method embodiment of a recognition method of a cigarette cartridge is provided according to the embodiment of the present disclosure.

It needs to be noted that the cigarette cartridge is combined with a cigarette rod to form an electronic cigarette in the embodiment of the present disclosure. The cigarette rod includes: a battery and a controller connected with the battery. The cigarette cartridge includes: an atomizer and a recognition information provider component connected with the atomizer. The atomizer is connected with the controller via the recognition information provider component. As shown in FIG. 1, the controller 104 includes: a first interface A1, the recognition information provider component 204 includes: a second interface B1, and the atomizer 202 includes: a first end C1, wherein the first interface A1, the second interface B1 and the first end C1 are all connected with a ground wire or a power wire. The controller 104 further includes: a third interface A2, the recognition information provider component 204 further includes: a fourth interface B2, and the atomizer 202 further includes: a second end C2, wherein the third interface A2, the fourth interface B2 and the second end C2 may be connected by the following method: the fourth interface B2 is connected with the third interface A2, a connection line therebetween is a first connection line l, and the second end C2 is connected with the third interface A2. In this connection manner, pulse sequences corresponding to the recognition information (e.g. an ID number) stored in the recognition information provider component 204 in the cigarette cartridge 20 are generated on the first connection line l and the ground wire (or the power wire), so as to enable the controller 104 of the cigarette rod 10 to read the pulse sequences, decode the pulse sequences, and verify whether the cigarette cartridge 20 and the cigarette rod 10 are matched.

Figure 2:
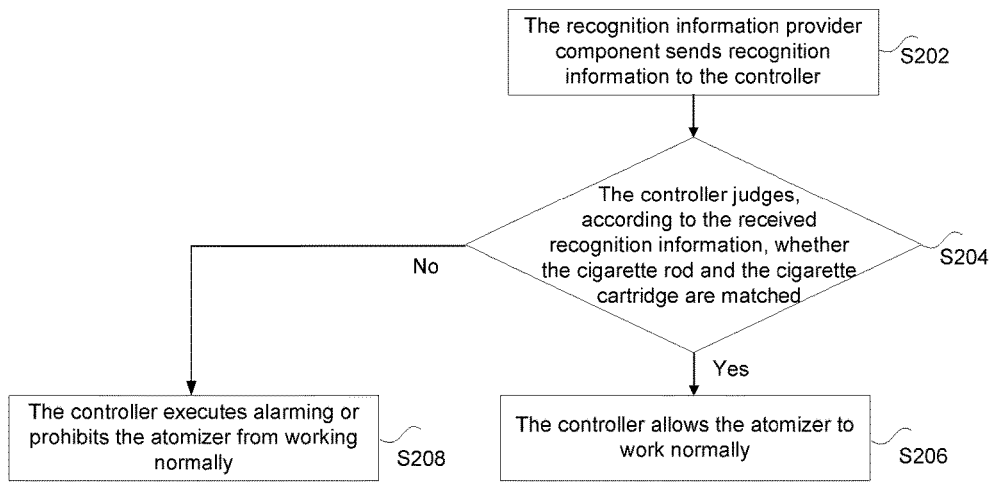
FIG. 2 is a flowchart of an optional recognition method of a cigarette cartridge according to an embodiment of the present disclosure.

FIG. 2 is a flowchart of a recognition method of a cigarette cartridge according to an embodiment of the present disclosure. As shown in FIG. 2, the method includes the following steps.

Step 202: A recognition information provider component sends recognition information to a controller.

Step 204: The controller judges, according to the received recognition information, whether a cigarette rod and a cigarette cartridge are matched.

Step 206: If so, the atomizer is allowed to work normally.

Step 208: Otherwise, the controller executes alarming or prohibits the atomizer from working normally.

With reference to FIG. 1, specific recognition information may be stored in advance in the recognition information provider component 204 in use. After the cigarette rod 10 and the cigarette cartridge 20 are connected, the recognition information provider component 204 communicates with the controller 104. Specifically, the recognition information provider component 204 sends the specific recognition information to the controller 104 by means of pulse sequences. At the moment, the controller 104 receives these pulse sequences, and decodes the pulse sequences, so as to obtain recognition information (e.g. an ID number and so on) of the cigarette cartridge 20 to recognize whether cigarette cartridge 20 and the cigarette rod 10 are matched, and if so, allows the electronic cigarette to work. At the moment, a smoker may use the electronic cigarette normally. Otherwise, the electronic cigarette gives an alarm so as to prompt the smoker that the electronic cigarette cannot be used normally. Or the electronic cigarette does not give the alarm, and is directly prohibited from working. In this way, the cigarette rod 10 may be matched with a cigarette cartridge 20 of the same brand, or even of the same model, thereby prolonging the service life of the electronic cigarette and improving the effect in quitting smoking of the electronic cigarette.

By means of the embodiment, the cigarette rod 10 automatically recognizes whether the cigarette cartridge 20 is matched with the cigarette rod when the cigarette rod and the cigarette cartridge are connected, thereby achieving the purpose of using the cigarette rod 10 and the cigarette cartridge 20 in the electronic cigarette in a matched manner, preventing mix use of the cigarette rod 10 with a cigarette cartridge 20 of a different brand, or mix use with a replica of the cigarette cartridge 20, so as to implement the technical effect of enabling the smoker to use the electronic cigarette properly to improve an application safety factor of the electronic cigarette, prolong the service life of the electronic cigarette, and improve the effect in quitting smoking.

Alternatively, the recognition method may further include that an electric current in associated circuits of the cigarette cartridge locates is adjusted, so as to control the amount of smoke in the cigarette cartridge after the atomizer is allowed to work normally if the cigarette rod and the cigarette cartridge are matched, thus further precisely controlling the electronic cigarette to work normally, prolonging the service life of the electronic cigarette and improving the effect in quitting smoking of the electronic cigarette.

In addition, after the cigarette cartridge and the cigarette rod of the electronic cigarette are matched and the circuit between the battery and the atomizer is connected, the controller in a microphone structure of the electronic cigarette may adjust the electric current in the circuit effectively according to a model of the cigarette cartridge, so as to control the amount of discharged smoke of the atomizer.

It needs to be noted that the methods, principles and processes of recognizing the cigarette cartridge in the fourth embodiment are the same as the methods, principles and processes of recognizing the cigarette cartridges in the first embodiment to the third embodiment respectively, and will not be repeated here.

The sequence numbers of the embodiments of the present disclosure are merely used for description, but do not represent advantages and disadvantages of the embodiments.

In the foregoing embodiments of the present disclosure, each embodiment has a different focus when described. For a part not described in detail in a certain embodiment, reference may be made to related description of other embodiments.

In several embodiments provided by the present application, it should be understood that the disclosed technical content may be implemented in other ways, wherein the described device embodiments are merely exemplary. For example, division of the units may be division of logical functions and may be other division in actual implementation. For example, multiple units or components may be combined or integrated into another system, or some features can be ignored or not performed. Furthermore, the shown or discussed coupling or direct coupling or communication connection with each other may be accomplished through some interfaces, and indirect coupling or communication connection between units or modules may be electrical, or in other forms.

Units described as separate components may be or may not be physically separated. Components shown as units may be or may not be physical units, that is, the components may be located in one place or may be also distributed on a plurality of units. Some or all of the units may be selected to achieve the objective of the solution of the embodiment according to actual demands.

In addition, various functional units in each embodiment of the present disclosure may be integrated in one processing unit, and may also exist as various separate physical units or two or more units may also integrated in one unit. The integrated unit may be implemented in a form of hardware, and may be also implemented in a form of a software functional unit.

If implemented in the form of the software functional unit, and sold or used as a separate product, the integrated unit may be stored in a computer readable storage medium. Based on such understanding, the technical solution of the present disclosure in essence, or the part contributing to the prior art, or all or part of the technical solution may be embodied in a form of a software product. The computer software product is stored in a storage medium, which includes several instructions to enable a computer device (which may be a personal computer, a server, or a network device and the like) to implement all or part of the steps of the method of each embodiment of the present disclosure. The aforementioned storage medium includes various media capable of storing program codes, including a Universal Serial Bus (USB) disk, a Read-Only Memory (ROM), a Random Access Memory (RAM), a mobile hard disk drive, a magnetic disk, an optical disk or the like.

The above are only preferred embodiments of the present invention. It should be pointed out that several improvements and modifications may be further made without departing from the principles of the present invention for those of ordinary skill in the art. These improvements and modifications shall be also regarded as the protection scope of the present invention.

What is claimed is:
1. An electronic cigarette, comprises a cigarette rod and a cigarette cartridge, wherein
the cigarette rod comprises: a battery and a controller connected with the battery;
the cigarette cartridge comprises: an atomizer and a recognition information provider component connected with the atomizer, wherein the atomizer is connected with the controller via the recognition information provider component, wherein
the controller comprises: a first interface,
the recognition information provider component comprises: a second interface, and
the atomizer comprises: a first end,
wherein the first interface, the second interface and the first end are all connected with a ground wire or a power wire;
the controller further comprises: a third interface,
the recognition information provider component further comprises: a fourth interface,
the atomizer further comprises: a second end,
wherein the fourth interface is connected with the third interface, and the second end is connected with the third interface;
wherein the recognition information provider component is configured to send recognition information to the controller,
the controller is configured to judge, according to the received recognition information, whether the cigarette rod and the cigarette cartridge are matched,
and if matched, allows the atomizer to work normally;
otherwise, the controller executes alarming or prohibits the atomizer from working normally.

2. The electronic cigarette according to claim 1, wherein the cigarette rod further comprises: a microphone structure and the controller is arranged in the microphone structure.

3. The electronic cigarette according to claim 1, wherein the recognition information is transmitted in a form of an electric signal.

4. The electronic cigarette according to claim 3, wherein the electric signal carries at least one of brand information, model information and production batch information of the cigarette cartridge.

5. The electronic cigarette according to claim 1, wherein the recognition information provider component comprises: a capacitor, wherein
the capacitor charges and discharges in a case that the cigarette rod and the cigarette cartridge are connected;
during discharging process, the capacitor functions as a power source to provide electric energy for the cigarette rod to recognize the cigarette cartridge.

6. The electronic cigarette according to claim 1, the controller is further configured to receive recognition information from the recognition information provider component.

7. The electronic cigarette according to claim 1, the controller is further configured to judge, according to the received recognition information, whether the cigarette rod and the cigarette cartridge are matched; and if matched, allows the atomizer to work normally; if not matched, the controller executes alarming or prohibits the atomizer from working normally.

8. The electronic cigarette according to claim 1, the controller is further configured to adjust an electric current in associated circuits of the cigarette cartridge locates, so as to control the amount of smoke in the cigarette cartridge.

9. A cigarette cartridge, configured to form an electronic cigarette with a cigarette rod, wherein the cigarette cartridge comprises: an atomizer and a recognition information provider component connected with the atomizer, wherein
the recognition information provider component is configured to send recognition information to a controller;
the controller is configured to judge, according to the received recognition information, whether the cigarette rod and the cigarette cartridge are matched, and if matched, allows the atomizer to work normally; otherwise, the controller executes alarming or prohibits the atomizer from working normally; the cigarette rod comprises: a battery and the controller connected with the battery; the atomizer is connected with the controller via the recognition information provider component; the controller comprises: a first interface, the recognition information provider component comprises: a second interface, and the atomizer comprises: a first end, wherein the first interface, the second interface and the first end are all connected with a ground wire or a power wire; the controller further comprises: a third interface, the recognition information provider component further comprises: a fourth interface, and the atomizer further comprises: a second end, wherein the fourth interface is connected with the third interface and the second end is connected with the third interface.

10. A cigarette rod, configured to form an electronic cigarette with a cigarette cartridge, wherein the cigarette rod comprises: a battery and a controller connected with the battery, wherein the controller is configured to judge, according to received recognition information sent by a recognition information provider component, whether the cigarette rod and the cigarette cartridge are matched, and if matched, allows an atomizer to work normally; otherwise, the controller executes alarming or prohibits the atomizer from working normally; the cigarette cartridge comprises: the atomizer, and the recognition information provider component connected with the atomizer; the atomizer is connected with the controller via the recognition information provider component; the controller comprises: a first interface, the recognition information provider component comprises: a second interface, and the atomizer comprises: a first end, wherein the first interface, the second interface and the first end are all connected with a ground wire or a power wire; the controller further comprises: a third interface, the recognition information provider component further comprises: a fourth interface, and the atomizer further comprises: a second end, wherein the fourth interface is connected with the third interface, and the second end is connected with the third interface.

11. The cigarette rod according to claim 10, the controller is further configured to receive recognition information from the recognition information provider component.

12. The cigarette rod according to claim 10, the controller is further configured to judge, according to the received recognition information, whether the cigarette rod and the cigarette cartridge are matched; and if matched, allows the atomizer to work normally; if not matched, the controller executes alarming or prohibits the atomizer from working normally.

13. The cigarette rod according to claim 10, the controller is further configured to adjust an electric current in associated circuits of the cigarette cartridge locates, so as to control the amount of smoke in the cigarette cartridge.

14. The cigarette cartridge according to claim 10, the controller is further configured to receive recognition information from the recognition information provider component.

15. The cigarette cartridge according to claim 10, the controller is further configured to judge, according to the received recognition information, whether the cigarette rod and the cigarette cartridge are matched; and if matched, allows the atomizer to work normally; if not matched, the controller executes alarming or prohibits the atomizer from working normally.

16. The cigarette cartridge according to claim 10, the controller is further configured to adjust an electric current in associated circuits of the cigarette cartridge locates, so as to control the amount of smoke in the cigarette cartridge.

* * * * *